US007767085B2

(12) United States Patent
Urquhart et al.

(10) Patent No.: US 7,767,085 B2
(45) Date of Patent: Aug. 3, 2010

(54) OIL-SLUDGE FILTRATION SYSTEM HAVING A FREE FLOATING WEIR BOX

(75) Inventors: Gordon T. Urquhart, Birmingham, MI (US); James E. Miller, Troy, MI (US)

(73) Assignee: Air and Liquid Systems, Inc., Rochester Hills, MI (US)

( * ) Notice: Subject to any disclaimer, the term of this patent is extended or adjusted under 35 U.S.C. 154(b) by 568 days.

(21) Appl. No.: 11/674,309

(22) Filed: Feb. 13, 2007

(65) Prior Publication Data
US 2008/0190834 A1  Aug. 14, 2008

(51) Int. Cl.
B01D 17/032 (2006.01)
(52) U.S. Cl. .................... 210/242.3; 210/300; 210/526; 210/540
(58) Field of Classification Search .................. 210/122, 210/242.1, 242.3, 258, 259, 299, 300, 301, 210/523, 525, 526, 527, 538, 540
See application file for complete search history.

(56) References Cited

U.S. PATENT DOCUMENTS

| 3,219,188 | A | | 11/1965 | Hirs | |
|---|---|---|---|---|---|
| 4,132,645 | A | * | 1/1979 | Bottomley et al. | 210/540 |
| 4,585,557 | A | | 4/1986 | Turnquist | |
| 4,713,181 | A | | 12/1987 | Russell | |
| 4,746,424 | A | * | 5/1988 | Drew | 210/242.1 |
| 5,059,312 | A | * | 10/1991 | Galletti | 210/242.3 |
| 5,078,863 | A | * | 1/1992 | Durigon | 210/242.1 |
| 5,370,792 | A | | 12/1994 | Bhatnagar et al. | |
| 5,372,711 | A | | 12/1994 | Sill | |
| 5,378,376 | A | * | 1/1995 | Zenner | 210/540 |
| 5,702,240 | A | | 12/1997 | O'Neal et al. | |
| 5,738,782 | A | * | 4/1998 | Schafer et al. | 210/526 |
| 5,840,187 | A | | 11/1998 | Derenthal et al. | |
| 6,277,273 | B1 | * | 8/2001 | Gore et al. | 210/242.1 |
| 6,322,694 | B1 | * | 11/2001 | Iliadis et al. | 210/242.3 |
| 6,761,820 | B2 | | 7/2004 | Miller | |
| 6,797,161 | B2 | * | 9/2004 | Use et al. | 210/300 |
| 6,962,656 | B2 | * | 11/2005 | Davidian et al. | 210/523 |
| 7,368,054 | B2 | * | 5/2008 | Porter et al. | 210/242.3 |

OTHER PUBLICATIONS

Skimoil, Inc., St. Louis, MO, "The Floating Weir Surface/Oil Skimmer", www.skimoil.com/floating_weir.htm, pp. 1-4.

* cited by examiner

Primary Examiner—Christopher Upton
(74) Attorney, Agent, or Firm—Warn Partners, P.C.; Gregory L. Ozga

(57) ABSTRACT

A system for consolidating and removing contaminate such as paint sludge or oils from a fluid mixture. A contaminate tank receives a supply of the fluid mixture containing contaminate from a source such as a manufacturing line where overspray of paints or cleaning solutions containing washed away oils are collected. A free floating weir floats on the surface of the contaminate tank and mechanically separates and removes contaminate from a surface of the contaminate tank and concentrates the contaminate in a consolidation tank. In the consolidation tanks the contaminate is further separated and collected for disposal.

8 Claims, 5 Drawing Sheets

OIL-SLUDGE FILTRATION SYSTEM HAVING A FREE FLOATING WEIR BOX

FIELD OF THE INVENTION

The present invention relates to systems for filtering contaminate such as paint sludge and oil from a solution.

BACKGROUND OF THE INVENTION

During the manufacture of painted parts, such as automotive body parts industrial wastes are produced. By-products such as paint sludge particles and oils are produced and require proper disposal. Systems for concentrating, filtering and removing paint sludge particles and oils from mixtures derived from industrial solutions are necessary to meet environmental standards.

A common technique for capturing paint overspray/airborne paint particulate produced when operating a paint spray booth is to capture the particulate in a waterfall backdrop within the spray booth. The resulting water-and-particulate fluid mixture is then channeled into a suitable system in which the paint particulate is substantially removed from the water. The filtered water is thereafter advantageously recirculated back to the spray booth's waterfall backdrop to capture more airborne paint particulate.

A similar pre-treatment process is used prior to spray painting the part in order to remove oil residue that can be on the surface of the parts either from transport or from the cutting and pressing processes. Similar to the paint process described above, the mixture of oil and solution also needs to be treated. This particular process involves treating or washing the part with a solution to remove the oil residue. The solution with the oil residue is collected and channeled in a manner similar to the painting process described above.

The paint sludge and oil filtration systems discussed above often require large amounts of solution to be filtered. This in turn requires larger pumps and a larger or greater number of filters if necessary, to be used. Thus it is desirable to design systems that concentrate the contaminate (i.e., paint sludge or oil residue) in order to eliminate filtering and separating large volumes.

Another problem that can occur is during system shutdowns back pressure in the recycling lines cause mixtures of solution and contaminate to backup into the contaminate tank; it is desirable to have a system that will continue to filter and remove the contaminate in the areas where the backup can occur in order to reduce the energy consumption of the pumps in the system.

Another issue that can be encountered is that existing systems often lack the ability to adapt to drastic changes in fluid levels in the various tanks or account for foam and other coagulated particles floating on the surface of the solution which can give false readings as to the actual fluid levels in the tanks. Thus it is desirable to develop systems that can adapt or account for such conditions.

SUMMARY OF THE INVENTION

A system for consolidating and removing contaminate such as paint sludge or oils from a fluid mixture. A contaminate tank receives a supply of the fluid mixture containing contaminate and solution from a source such as a spray booth or pre-treatment booth where overspray of paints or cleaning solutions containing washed away oils are collected. A free floating weir floats on the surface of the contaminate tank and mechanically separates and removes contaminate from a surface of the contaminate tank. A consolidation tank is connected to and receives contaminate collected by the floating weir. In the consolidation tank contaminate begins to float on the surface in greater concentrations than in the contaminate tank. A surface scraper is used to collect the concentrated contaminate that is proximate to the surface of the consolidation tank. A contaminate chute is operatively associated with the scraper and receives contaminate removed by the scraper. The contaminate chute leads to a drying bag for receiving contaminate from the contaminate chute. From there contaminate is collected in the drying bag can be removed and disposed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
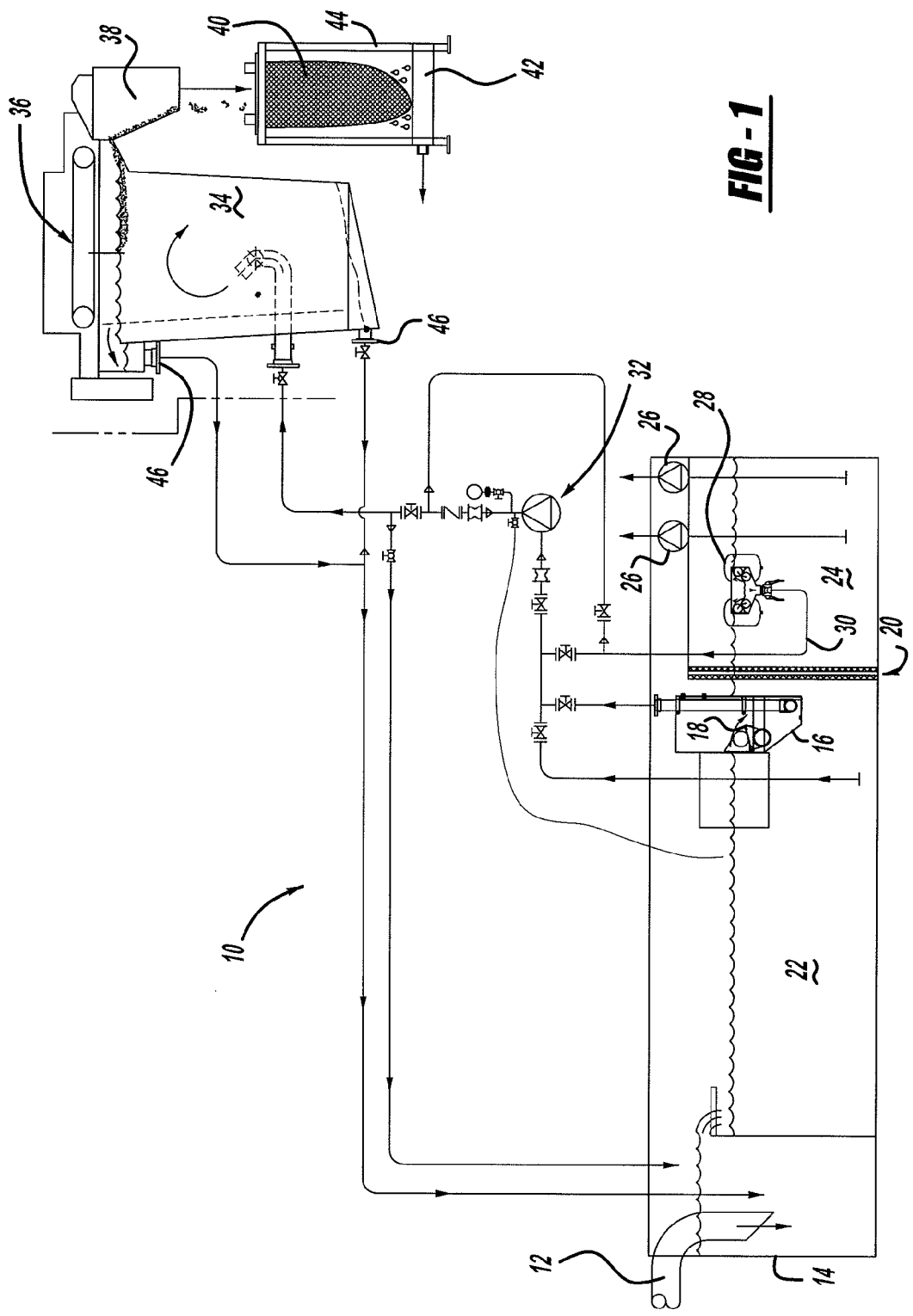
FIG. 1 is a schematic view of a first embodiment of the invention.

Referring to FIG. 1 a schematic diagram of a system 10 for consolidating and removing contaminate from a fluid mixture. The fluid mixture containing contaminate such as paint sludge particles or oils contained in a solution, such as water or a hydrophobic wash solution which together form a fluid mixture. The fluid mixture is obtained from the waterfall of a paint spray booth and/or a catch basin for spray painting or washing automotive parts. The waterfall and catch basin is channeled through an inlet pipe 12 or spray header that empties into a contaminate tank 14.

The contaminate tank 14 in this particular embodiment is quite large and can hold approximately 5,000 to 150,000 gallons. However, it is possible to a contaminate tank 14 of virtually any size to be used if needed. Within the contaminate tank 14 a stationary weir 16 is positioned to operably align with the surface of the fluid mixture contained in the contaminate tank 14. The stationary weir 16 has a hinged door 18 that is connected to a float that opens and closes to allow the fluid mixture to enter the stationary weir 16. When used in a paint sludge removal application the fine particles of paint will float on the surface of the fluid mixture in the contaminate tank 14 and be trapped or gathered by the stationary weir 16 which has the hinged door 18 located adjacent the surface of the fluid mixture.

The contaminate tank 14 is divided by one or more pump screens 20 so that the contaminate tank has a first section 22 and a second section 24. The pump screens 20 aid in keeping some of larger particles of paint or booth debris from crossing from the first section 22 into the second section 24. In the second section 24 is one or more booth pumps 26 which function to recycle or supply solution back to the manufacturing processes. One example is where the booth pumps 26 will pump solution back to the waterfalls in the paint spray booths. Thus it is important to prevent large particles of paint from building up within the second section 24.

Despite the fact that the pump screens 20 remove the paint sludge on the surface of the fluid mixture in the second section 24 in order to block the passage of larger paint particles, smaller particles can still pass and enter the booth pumps 26. This is not usually a problem except when the booth pumps 26 are shutdown the booth pumps 26 and their pipes will drain back into the contaminate tank 14. As a result some of the finer paint particles that made it past the pump screens 20 may accumulate on the surface of the second section 24. Thus it is desirable during the shutdown period to prevent damage or overheating of the booth pumps 26 by removing the accumulated paint sludge in the second section 24. In order to resolve this problem a floating weir 28 is positioned in the second section 24. The floating weir 24 will operate to remove paint sludge in the second section.

The floating weir 28 is a free floating weir box that has a hose 30 connecting to the weir box for removing the paint sludge that is collected. The stationary weir and the floating weir 28 both are connected to a vacuum pump assembly 32 that facilitates the removal of the paint sludge and solution that becomes trapped by the stationary weir 16 and floating weir 28.

The vacuum pump assembly 32 moves the paint sludge to a consolidation tank 34 where the fluid mixture is more concentrated with paint sludge. The paint sludge will float to the surface of the consolidation tank because the specific gravity of the paint sludge is less than the specific gravity of the solution. At the top of the consolidation tank 34 is a scraper assembly 36 that has a moveable scraper that moves along the surface of the consolidation tank 34. The scraper assembly 36 pushes the paint sludge into a contaminate chute 38 that empties the paint sludge material into a drying bag 40. In the drying bag wet paint sludge is gathered.

The drying bag 40 is porous and allows the solution to drip away from the paint sludge into a drip pan 42 where it can be removed or re-introduced back to the contaminate tank 14. Once the drying bag 40 has become full it can be removed and the dried paint sludge material can be disposed of. The drying bag 40 can also be contained in a canister 44 that can be heated to facilitate the evaporation or drying process of the paint sludge material. The consolidation tank 34 also has several drains 46 that allow the solution that has been separated from the paint sludge to be re-introduced back to the contaminate tank 14 so that it may ultimately be recycled through the booth pumps 26 back to the paint spray booth.

Figure 2:
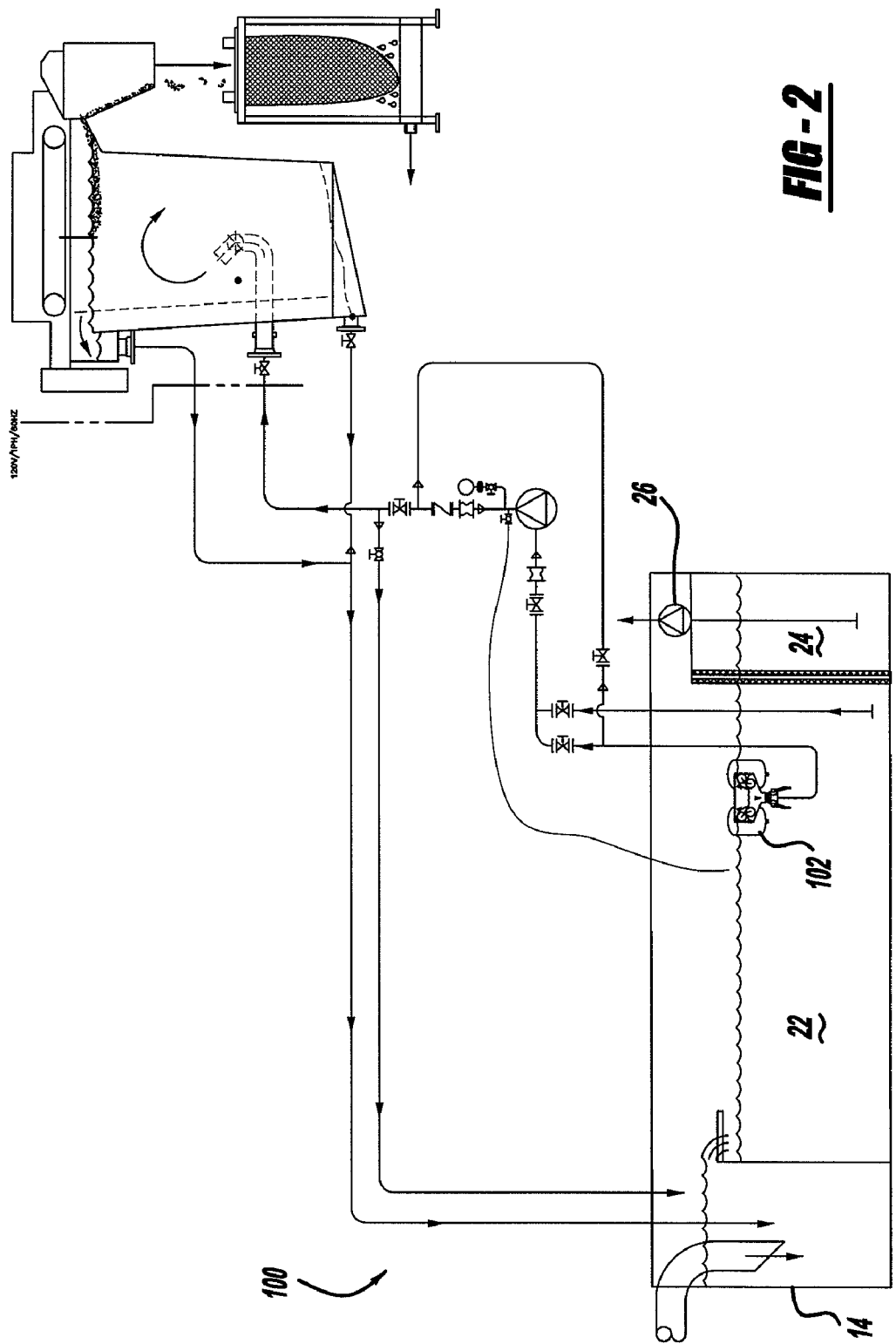
FIG. 2 is a schematic view of a second embodiment of the invention.

Referring now to FIG. 2 an alternate system is shown. Like reference numerals will be used to indicate structures similar to those shown in FIG. 1. A system 100 shown in FIG. 2 is similar to the system shown in FIG. 1. The main difference is that this particular system does not have a stationary weir, but instead has a floating weir 102 within the first section 22 of the contaminate tank 14. The second section 24 of the contaminate tank does not have a weir box within and only has a single booth pump 26. The type of system shown in FIG. 2 would be for a smaller type of operation wherein a lower volume of fluid mixture such as 200-2000 gallons would need to be filtered. However, it is possible to a contaminate tank 14 of virtually any size to be used if needed.

The type of system depicted in FIG. 2 provides more level control as well as eliminating the problem of pump cavitation. In paint sludge recovery applications the surface of the contaminate tank 14 can become covered with foam or coagulated paint sludge. This can cause existing paint sludge recovery systems to misread the true fluid levels in the contaminate tank 14. For example some systems employ a sonic sensor to determine the fluid level. Foam or coagulated paint sludge can give a false reading indicated that the liquid levels in the tank are significantly higher than the true liquid level. The floating weir of the present invention solves this problem because it is always on the surface of the liquid in the contaminate tank 14. This eliminates any issues of not having enough liquid to supply to the system which can result in cavitation of the pump. Additionally this type of system would allow for the easier re-location or if a user anticipates moving the system to various locations in order to find the "best" location within their facilities. Also this type of system is smaller and would reduce the overall installation costs that would normally be incurred for larger systems.

Figure 3:
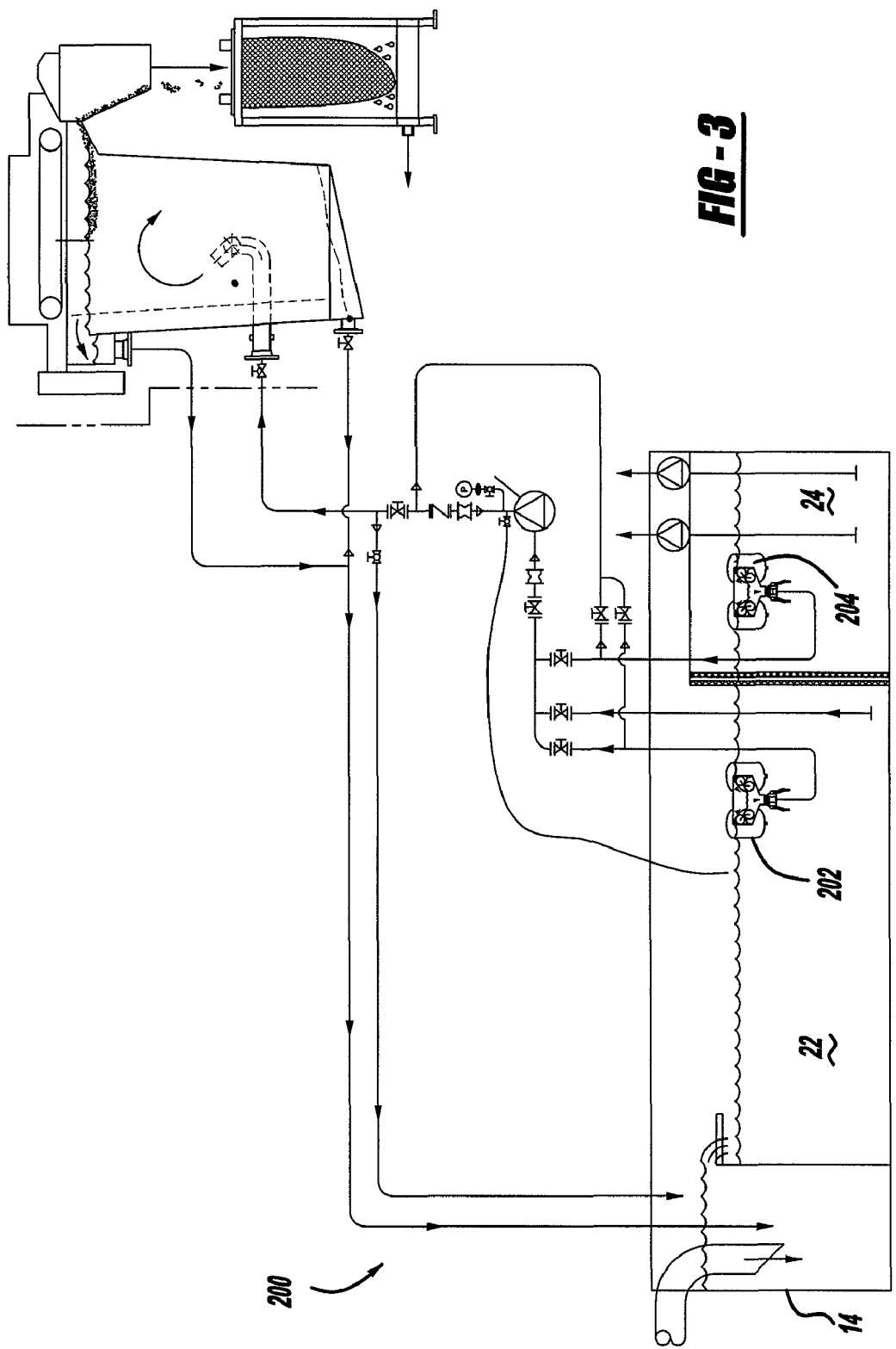
FIG. 3 is a schematic view of a third embodiment of the invention.

Referring now to FIG. 3 wherein like reference numerals are used to indicate similar structures that were indicated in FIGS. 1 and 2. A system 200 is depicted as having a first floating weir 202 positioned in the first section 22 of the contaminate tank 14. A second floating weir 204 is positioned in the second section 24 of the contaminate tank 14. The contaminate tank 14 in this type of application could be between 200 and 10,000 gallons. However, it is possible to a contaminate tank 14 of virtually any size to be used if needed.

This application shown in FIG. 3 wherein two floating weirs are used is advantageous in systems where there are plants that do not have a central waste treatment system and a large centralized system would not be practical. In large systems as well as other smaller types of systems the systems will be shut down so that the spray booths can be cleaned. During the cleaning process the liquid level in the contaminate tank 14 will rise due to liquid being added from the cleaning process. The only way the liquid level in the contaminate tank 14 returns to normal is for evaporation to occur. In the meantime the system will run with liquid levels that are above the normal operating levels. The use of floating weirs solves this problem because the weir is always as on the surface of the liquid in the contaminate tank 14. Thus the floating weirs are always at normal operating levels.

Figure 4:
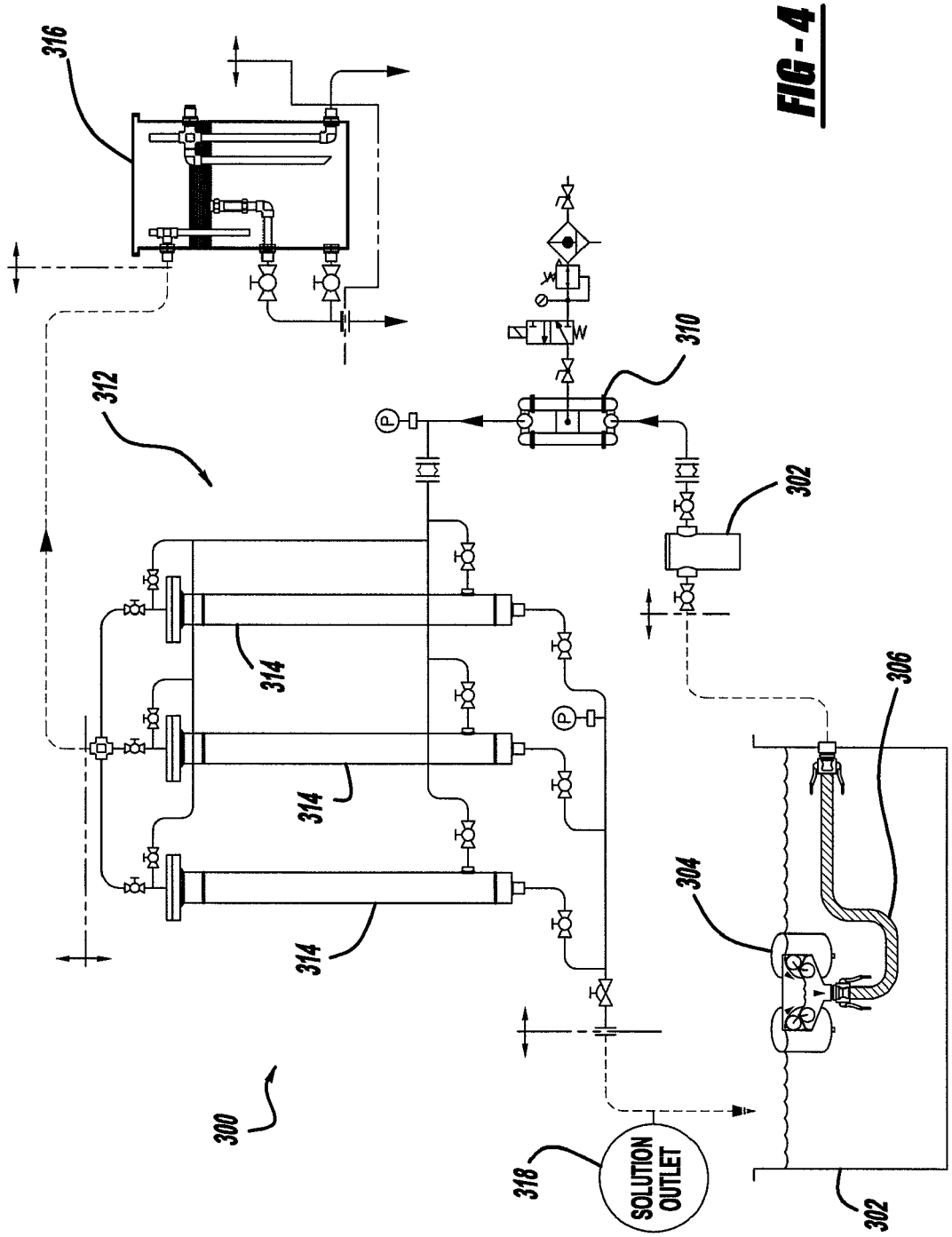
FIG. 4 is a schematic view of a fourth embodiment of the invention.

Referring now to FIG. 4 a schematic embodiment of an oil skimmer system 300 is generally shown. In this particular embodiment a contaminate tank 302 receives a fluid mixture of solution and oils from an auto part treatment booth. Prior to spray paint, auto parts the parts must be washed and treated in order to remove any oil residues that are present on the surface of the part, otherwise the oil residue can cause bubbling or peeling of the paint. The oil residue is often applied during transport in order to prevent the part from rusting or becoming scratched. Secondly oil residues can also sometimes be present as a result of the cutting and pressing processes used to create the part. A solution is used to wash the part to remove the residue from the part surface. This solution is collected in the contaminate tank 302 where the oil can be separated from the solution and the solution can be recycled back to the treatment booth.

Within the contaminate tank 302 is a floating weir 304 that floats on the surface and skims the oil residue away from a majority of the fluid mixture. Connected to the floating weir 304 is a vacuum hose 306 that leads to a strainer 308 wherein unwanted solid particles are removed prior to filtration. The solid particles can be metal shavings from the cutting and manufacturing process and their removal is important because they can clog or damage the filtration system. After passing through the strainer 308 the oil residue and solution mixture passes through a pump 310 which supplies the suction to the floating weir 304. The pump 310 in one embodiment can be a diaphragm pump; however, it is possible for virtually any style of pump to be used as long as the pump does not emulsify the solution. The solution is then passed to an oil/water hydrocyclone unit 312 which have one or more filtration columns that separate the oil residue from the solution. After filtration the waste oil progresses to a decant tank where it is further concentrated, collected and separated. The solution that has been separated by the hydrocyclones 314 is removed and re-introduced through a solution outlet 318 back to the contaminate tank 312 wherein a booth pump (not shown) can draw fluid from the contaminate tank 314 and introduce it to the spray headers or educators for agitation at the surface of the part to be washed.

Figure 5A:
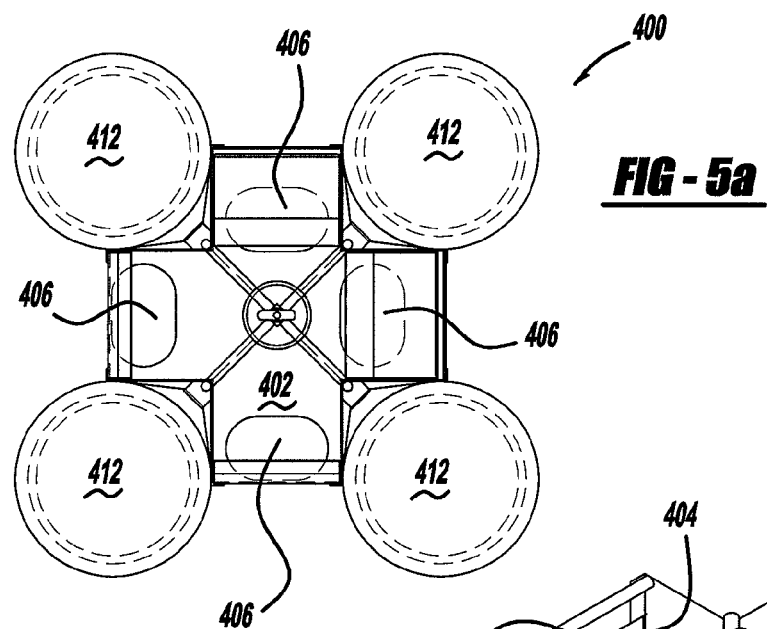
FIG. 5a is an overhead plan view of the floating weir.
Figure 5B:
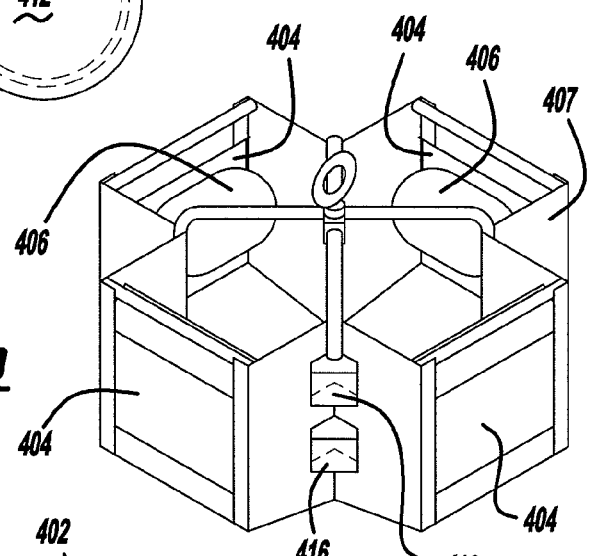
FIG. 5b is a perspective view of the suction box of the weir.
Figure 5C:
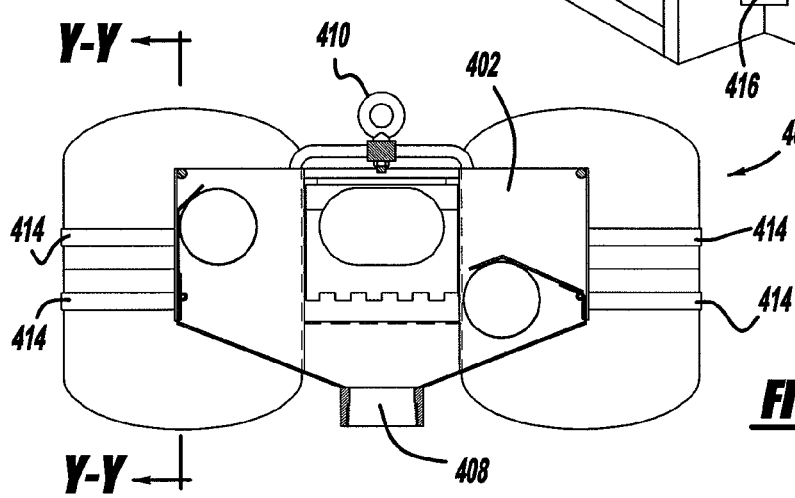
FIG. 5c is a cross-sectional side plan view of the floating weir.

Referring now to FIGS. 5a-5c a floating weir 400 identical to those shown in the embodiments depicted in FIG. 1-4 is shown in greater detail. The floating weir 400 has a suction box 402 that collects the contaminate (e.g., paint sludge or oils) from the tank that it is position within. The suction box 402 has four hinged doors 404 that each have a float member 406 attached to the back side of each hinged door 404 for controlling the opening and closing of the door. The float members 406 float on the surface of the liquid contained within the suction box 402 in order to control the position of the hinged door 404. This in turn controls the ingress of fluid from the tank into the suction box 402. When the fluid levels in the suction box 402 are low the hinged door 404 will be more open and when the fluid levels in the suction box 402 are high the hinged door 404 will be more closed.

The suction box 402 has an outlet 408 that connects to a vacuum hose for providing suction to the suction box 402. A lifting eyelet 410 is positioned at the top of the suction box 402 for removing the floating weir 400 from the tank that the floating weir is placed within. The suction box 402 has four flotation canisters 412 which can be filled with air for giving the floating weir 400 buoyancy. Alternatively the flotation canisters 412 can be filled with some other substance that is sufficient to provide buoyancy to the floating weir 400 on the surface of a tank full of fluid.

The flotation canisters 412 are connected to the suction box 402 by one or more adjustment bands 414 that wrap around each of the flotation canisters and connect through one or more eyelets 416 formed on the exterior surface of the suction box 402. The suction box 402 is adjustable along the height of the vertical axis Y-Y of the flotation canisters 412 by placing the bands 414 and suction box 402 at a different height.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for consolidating and removing contaminate such as paint sludge or oils from a fluid mixture, the system comprising:

a contaminate tank receiving a supply of the fluid mixture containing contaminate;

a floating weir free floating on the surface of the contaminate tank for mechanically separating and removing the contaminate from a surface of the fluid mixture collected in the contaminate tank;

a consolidation tank for receiving the contaminate from contaminate tank, wherein said consolidation tank includes a surface scraper for collecting contaminate proximate to the surface of the consolidation tank;

a contaminate chute operatively associated with the scraper for receiving the contaminate removed by the scraper;

a drying bag for receiving contaminate from the contaminate chute;

a pump screen dividing said contaminate tank into a first section where said fluid mixture enters and a second section where a portion of said fluid mixture exits said contaminate tank; and one or more booth pumps contained in said second section contaminate tank for removing said portion of said fluid mixture.

2. The system of claim 1 wherein said floating weir further comprises:

a suction box having two or more hinged doors each having a float member connected to said two or more hinged doors;

two or more floatation cylinders operably connected to said suction box; and a vacuum hose connected to said suction box for removing contaminate from said suction box.

3. A system for removing contaminate including consolidated paint sludge or oils from a fluid mixture, the system comprising:

a contaminate tank receiving a supply of the fluid mixture containing contaminate;

a pump screen dividing said contaminate tank into a first section where said fluid mixture enters and a second section where a portion of said fluid mixture exits said contaminate tank;

a first floating weir free floating on the surface of said first section of the contaminate tank for mechanically separating and removing the contaminate from a surface of the fluid mixture collected in said first section;

a second floating weir free floating on the surface of said second section of the contaminate tank for mechanically separating and removing the contaminate from a surface of the fluid mixture collected in said second section;

a consolidation tank for receiving the contaminate collected by said first floating weir and said second floating weir, wherein said consolidation tank includes a surface scraper for collecting contaminate proximate to the surface of the consolidation tank;

a contaminate chute operatively associated with the scraper for receiving the contaminate removed by the scraper, and a drying bag for receiving contaminate from the contaminate chute.

4. The system of claim 3 further comprising:

one or more booth pumps contained in said second section contaminate tank for removing a portion of said fluid mixture.

5. The system of claim 3 wherein said first floating weir and said second floating weir both further comprise:

a suction box having two or more hinged doors each having a float member connected to said two or more hinged doors;

two or more floatation cylinders operably connected to said suction box; and a vacuum hose connected to said suction box for removing contaminate from said suction box.

6. A system for removing contaminate including consolidated paint sludge or oils from a fluid mixture, the system comprising:
- a contaminate tank receiving a supply of the fluid mixture containing contaminate;
- a pump screen dividing said contaminate tank into a first section where said fluid mixture enters and a second section where a portion of said fluid mixture exits said contaminate tank;
- a stationary weir operably connected to a stationary surface in said first section of the contaminate tank for mechanically separating and removing the contaminate from a surface of the fluid mixture collected in said first section;
- a floating weir free floating on the surface of said second section of the contaminate tank for mechanically separating and removing the contaminate from a surface of the fluid mixture collected in said second section;
- a consolidation tank for receiving the contaminate collected by said stationary weir and said floating weir, wherein said consolidation tank includes a surface scraper for collecting contaminate proximate to the surface of the consolidation tank;
- a contaminate chute operatively associated with the scraper for receiving the contaminate removed by the scraper;
- a drying bag for receiving contaminate from the contaminate chute;
- one or more booth pumps contained in said second section of said contaminate tank for removing said portion of said fluid mixture.

7. The system of claim 6 wherein said floating weir further comprises:
- a suction box having two or more hinged doors each having a float member connected to said two or more hinged doors;
- two or more floatation cylinders operably connected to said suction box; and
- a vacuum hose connected to said suction box for removing contaminate from said suction box.

8. The system of claim 7 wherein said stationary weir further comprises:
- a suction box having a hinged door having a float member connected to said hinged door;
and
- a vacuum hose connected to said suction box for removing contaminate from said suction box.

* * * * *